United States Patent
Butts et al.

(10) Patent No.: US 6,205,416 B1
(45) Date of Patent: *Mar. 20, 2001

(54) SERVER AND TERMINAL EMULATOR FOR PERSISTENT CONNECTION TO A LEGACY HOST SYSTEM WITH DIRECT OS/390 HOST INTERFACE

(75) Inventors: Thomas H. Butts, Wills Point; Stuart H. Burris, Jr., Garland; Gary W. Skinner, Carrollton; Stanley E. Prichard, III, Lewisville, all of TX (US)

(73) Assignee: Openconnect Systems Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/231,452

(22) Filed: Jan. 14, 1999

Related U.S. Application Data

(63) Continuation-in-part of application No. 09/069,522, filed on Apr. 29, 1998, which is a continuation of application No. 08/625,109, filed on Apr. 1, 1996, now Pat. No. 5,754,830.

(51) Int. Cl.[7] .................................................. G06F 9/455
(52) U.S. Cl. ........................ 703/27; 709/311; 710/105; 370/466; 370/469
(58) Field of Search ................................... 703/27, 26, 23; 709/246, 218, 206, 203, 227, 228, 313, 311; 705/9; 707/1; 370/466, 469; 710/105

(56) References Cited

U.S. PATENT DOCUMENTS

| 5,228,137 | 7/1993 | Kleinerman .............................. 703/26 |
|---|---|---|
| 5,475,836 | 12/1995 | Harris et al. ........................... 709/206 |
| 5,485,369 | 1/1996 | Nicholls et al. .......................... 705/9 |
| 5,497,463 | 3/1996 | Stein et al. .............................. 709/203 |
| 5,530,852 | 6/1996 | Maske, Jr. et al. ..................... 709/206 |
| 5,568,612 | 10/1996 | Barrett et al. .......................... 709/203 |
| 5,600,833 | 2/1997 | Senn et al. ................................ 707/1 |
| 5,617,540 | 4/1997 | Civanlar et al. ....................... 709/227 |
| 5,619,650 | 4/1997 | Bach et al. ............................. 709/246 |
| 5,634,006 | 5/1997 | Baugher et al. ....................... 709/228 |
| 5,634,127 | 5/1997 | Cloud et al. ........................... 709/313 |
| 5,636,371 | 6/1997 | Yu .......................................... 703/26 |
| 5,754,830 | * 5/1998 | Butts et al. ........................... 709/311 |

OTHER PUBLICATIONS

"Mobile Telescript Agents and the Web", by Domel, Compcon '96 IEEE Computer Society International, 1996, pp. 52–57.

(List continued on next page.)

*Primary Examiner*—Kevin J. Teska
*Assistant Examiner*—Russell W. Frejd
(74) *Attorney, Agent, or Firm*—Baker Botts L.L.P.

(57) ABSTRACT

A computer network environment (10) allowing connection of a client system (36) to a legacy host system (18,19) using a server (26) is provided The computer network environment (10) includes a legacy host system (18,19) having TCP/IP connectivity. The legacy host system (18,19) is operable to support a terminal session for access to the legacy host system (18,19). The computer network environment (10) also includes a server (26) operable to communicate with the legacy host system (18,19) across a persistent TCP/IP socket connection (30). The computer network environment (10) further includes a client system (36) executing an applet process (42) under a web browser (38). The applet process (42) is operable to communicate with the client thread (28) across another persistent TCP/IP socket connection (44) and is operable to provide a terminal session to a user of the client system (36) This terminal session is supported by a persistent connection allowing real-time bidirectional communication with the legacy host system (18,19), including a direct interface to an OS/390 host.

28 Claims, 3 Drawing Sheets

OTHER PUBLICATIONS

"Java Security: From HotJava to Netscape and Beyond", by Dean, et al., Security and Privacy 1996 IEEE Symposium, Feb. 1996, pp. 190–200.

"Mobile Intelligent Agent Systems: Wave vs. Java", by Vuong, et al., Emerging Technologies and Applications in Communication, 1996 IEEE Conference, Mar. 1996, pp. 196–199.

"Java and the Shift to Net–Centric Computing", by M. Hamilton, IEEE Computer Magazine, Aug. 1996, pp. 31–39.

"Java, the Web, and Software Development", by E. Yourdon, IEEE Computer Magazine, Aug. 1996, pp. 25–30.

"Interoperable Object Models for Large Scale Distributed Systems", by Newell, et al., IEE Colloq. No. 184: Client/Server Computing Seminer Proceedings, 1995, pp. 14/1–14/6.

Hot Java Applet Programming Contest–Winners third prize "Terminal Emulator", <http://www.javasoft.com/contest/winners.html and <http://www.javasoft.com/contest/authors.html.*

TN3270 Java Terminal Emulator and Libraries, <http://www.unige.ch/hotjava/HotSIBIL.html and <http://www.unige.ch/hotjava/TN3270.html.*

Curt Lang and Jeff Chow, Database Publishing on the Web & Intranets (The Coriolis Group, Inc. 1996); i–ii (title pages), vii–xiii (table of contents), 20–21, 40–45, 293, 334, 400, 425–427, 443, 474, and 499–510 (index).*

"Multiple Service Integration Confronted with Legacy Systems," by Louis Perrochon, Contributed to the Workshop Offering the same information via multiple services of the First International Conference on the World–Wide Web, Geneva, May 1994.

"Translation Servers: Gateways Between Stateless and Stateful Information Systems, " by Louis Perrochon, locaed on the World Wide Web, 1994.

"IDLE: Unified W3–Access to Interactive Information Servers," by Louis Perrochon, Roman Fischer, Computer Networks and ISDN Systems 27 (1995), pp. 927–938.

Amitabh Dave, Mohlaefi Sefika and Roy H. Campbell, "Proxies, Application Interfaces, and Distributed Systems," *Proc. 2nd Intl. Conf. on Object Orientation in Operating Systems,* Sep. 24–25, 1992, Dourdan, France.

Venkata N. Padmanabhan, Jeffrey C. Mogul, "Improving HTTP Latency, " Computer Networks and ISDN Systems 28 (1995), pp. 25–35.

Jeffrey C. Mogul, "The Case for Persistent–Connection HTTP, " *Proc. of ACM SIGCOMM '95* Conference of Application, Technologies, Architectures, and Protocols for Computer Communication, Aug. 28 to Sep. 1, 1995, Cambridge, Massachusetts.

* cited by examiner

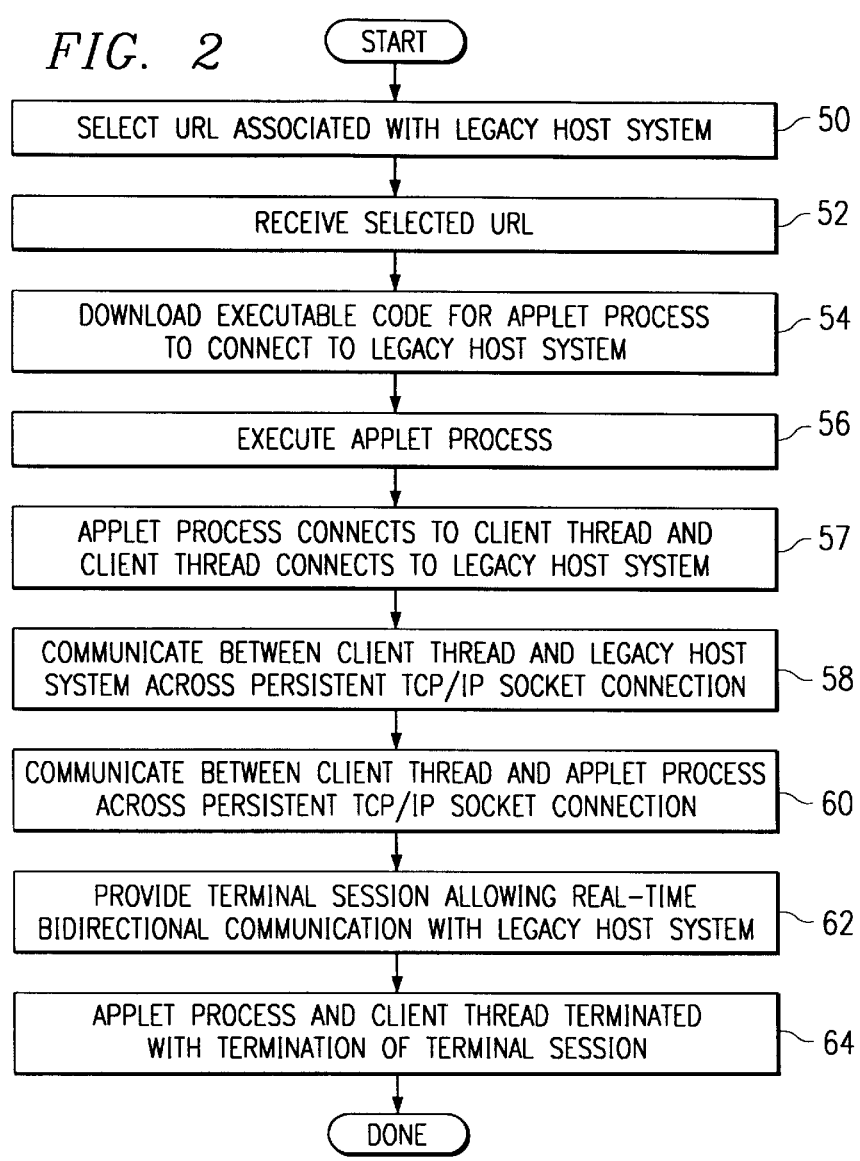
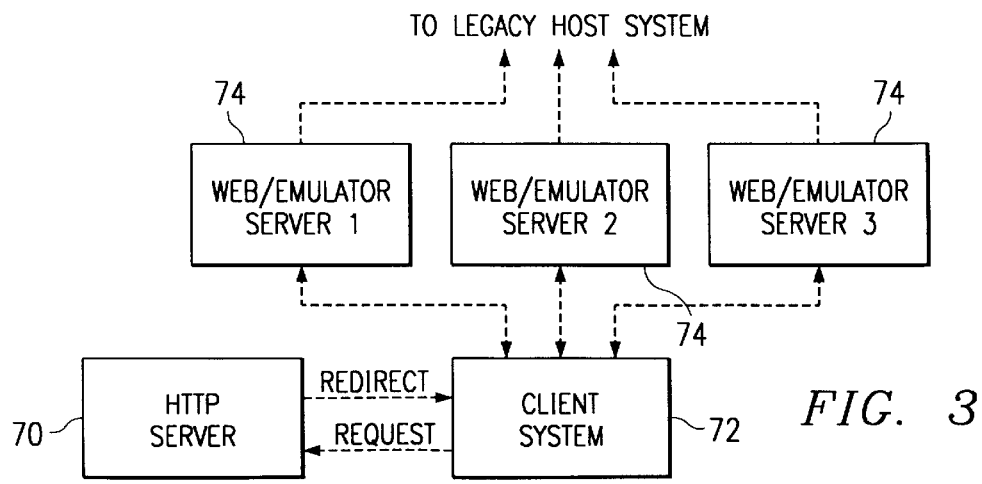

SERVER AND TERMINAL EMULATOR FOR PERSISTENT CONNECTION TO A LEGACY HOST SYSTEM WITH DIRECT OS/390 HOST INTERFACE

RELATED APPLICATIONS

This application is a continuation-in-part application of Application Ser. No. 09/069,522 filed Apr. 29, 1998, entitled, Server and Web Browser Terminal Emulator for Persistent Connection to a Legacy Host System and Method of Operation, which is a continuation application of application Ser. No. 08/625,109, filed Apr. 1, 1996 by Thomas H. Butts, et al. entitled, Server and Web Browser Terminal Emulator for Persistent Connection to a Legacy Host System and Method of Operation, now issued as U.S. Pat. No. 5,754,830.

TECHNICAL FIELD OF THE INVENTION

This invention relates in general to the field of electronic systems, and more particularly to a server and a web browser terminal emulator for persistent connection to a legacy host system and a method of operation.

BACKGROUND OF THE INVENTION

Many organizations operate computer network environments that include legacy host systems which store data and provide applications important to the operation of the organization. Such legacy host systems can include IBM mainframes (MVS, VM and VSE environments), IBM AS/400 systems and UNIX host systems.

It is desirable for such organizations to provide connection to the legacy host systems through terminal sessions on distributed client systems such as personal computers and computer workstations. This connection to the legacy host system provides access for users of the client systems to the data and applications on the legacy host system. These terminal sessions can include 3270, 5250, NVT and VT220 type terminal sessions.

One conventional method for providing terminal sessions is to execute a terminal emulator application on the client systems that connects directly to a host legacy system using a TCP/IP socket connection. Another conventional method is to provide connection through a web browser application by translating standard legacy data flows into HTML pages. However, such conventional web browser methods suffer from an inability to handle real-time host updates to user screens as well as other significant problems. For example, forms-based HTML/TN3270 packages are unable to overcome a range of problems associated with common HTML implementations such as real-time host updates to user screens or finding a user's browser platform address on the network.

SUMMARY OF THE INVENTION

One aspect of the invention is a computer-implemented terminal session emulator for providing browser-based access to legacy host applications. An emulation server is in communication with a web server, by being built into an existing web server or otherwise. The emulation server negotiates a persistent connection between a legacy host system and a client system. Applet code is operable to create an applet process executing under a web browser on a client system. This applet code is downloadable from the web server to the client system in response to receiving a uniform resource locator associated with the legacy host system. When executed by the client system, the applet process is operable to communicate with the emulation server to provide a terminal session to a user of the client system via the persistent connection. The applet code has an associated applet protocol, and the emulator server is further operable to provide direct access to a VTAM interface of an OS/390 host.

An advantage of the invention is that the need for a TN server is eliminated The emulation server is installed at the host system, and the web server also may be installed with the emulation server at the host. This two-tiered architecture optimizes network usage, reduces software maintenance issues, and leverages the scalability and reliability of IBM mainframes The invention permits end-to-end RSA encryption, from browser to mainframe.

BRIEF DESCRIPTION OF THE DRAWINGS

FIG. 2 is a flow chart of a method for connecting a client system to a legacy host system using a web/emulator server according to the teachings of the present invention;

FIG. 3 is a block diagram of load-balancing across multiple web/emulator servers according to the teachings of the present invention.

DETAILED DESCRIPTION OF THE INVENTION

System Overview

Figure 1:
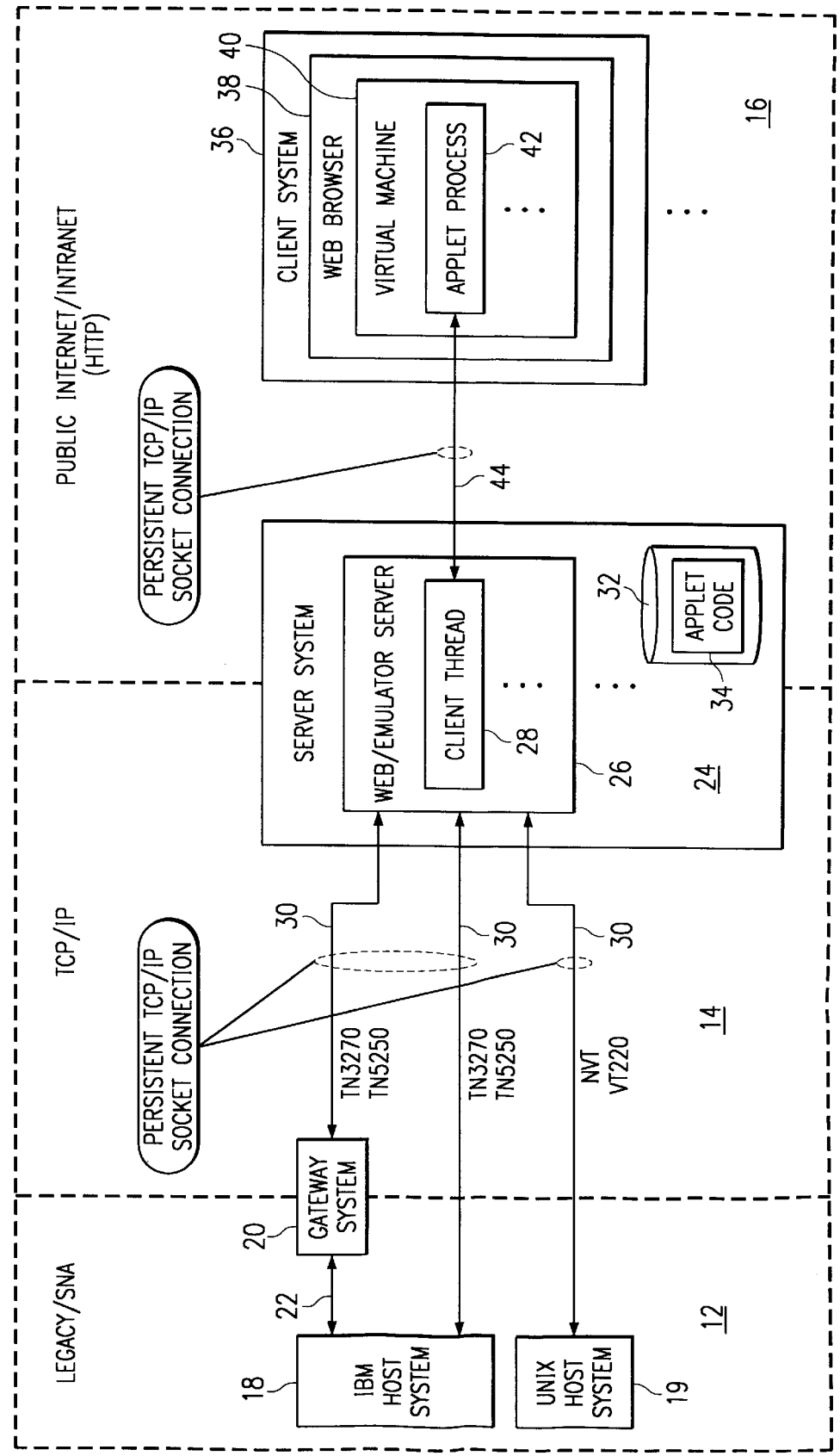
FIG. 1 is a block diagram of a computer network environment that allows connection of a client system to a legacy host system using a web/emulator server according to the teachings of the present invention.

FIG. 1 is a block diagram of a computer network environment, indicated generally at 10. Network environment 10 includes a legacy/SNA environment 12, a TCP/IP environment 14 and a public Internet/intranet environment 16.

Legacy/SNA environment 12 includes one or more legacy host systems such as an IBM host system 18 and a UNIX host system 19. IBM host system 18 can comprise an IBM mainframe (MVS, VM and VSE environment) or an IBM AS/400 system. UNIX host system 19 can comprise a computer workstation or server running a UNIX-type environment.

A gateway system 20 can be coupled to IBM host system 18 via a connection 22. Connection 22 can comprise an SNA or channel attachment to IBM host system 18. Gateway system 20 provides an interface between legacy/SNA environment 12 and TCP/IP environment 14. Gateway system 20 can be integral with IBM host system 18 or can be a separate, add-on system extending the functionality of IBM host system 18. For example, gateway system 20 can comprise an OC SERVER II™ gateway product available from OPENCONNECT SYSTEMS. UNIX host systems 19 and some IBM host systems 18 have built in TCP/IP connectivity such that the use of a gateway system 20 is unnecessary.

TCP/IP environment 14 includes a server system 24.

Server system 24 executes one or more web/emulator servers 26. Web/emulation server 26 provides an interface between TCP/IP environment 14 and public Internet/intranet environment 16 and is operable to execute one or more client threads 28. Web/emulator server 26 is operable to connect to gateway system 20, to IBM host system 18 and to UNIX host system 19 via a persistent TCP/IP socket connection 30. Server system 24 includes a data storage device 32 that stores applet code 34. Applet code 34 comprises executable code for an applet process. Web/emulation server 26 can comprise an OC://WEBCONNECT™ server available from OPENCONNECT SYSTEMS, and applet code 34 can comprise a JAVA applet for use within SUN MICROSYSTEM's JAVA environment.

Public Internet/intranet environment 16 includes one or more client systems 36. Client system 36 can comprise a desk top computer such as a personal computer or computer workstation. Client system 36 is operable to execute a web browser 38. Web browser 38 is operable to establish a virtual machine 40 for executing an applet process 42, Applet process 42 comprises an instance of applet code 34 downloaded to client system 36 by web/emulator server 26. Applet process 42 is connected to client thread 28 via a persistent TCP/IP socket connection 44. Web browser 38 can comprise a commercially available web browser application such as NETSCAPE NAVIGATOR that is JAVA-capable and applet process 42 can comprise a JAVA applet.

In operation, web/emulator server 26, client thread 28 and applet process 42 form a web browser terminal emulator providing a persistent bidirectional connection between client system 36 and a legacy host system such as IBM host system 18 or UNIX host system 19. Applet process 42 communicates with client thread 28 across persistent TCP/IP socket connection 44. Client thread 28 communicates with an appropriate legacy host system, either IBM host system 18 or UNIX host system 19, across a persistent TCP/IP socket connection 30 Client thread 28 and applet process 42 allow a user of client system 36 to use web browser 38 to invoke a terminal session for accessing data and applications on a legacy host system. Each web/emulation server 26 is operable to manage a plurality of client threads 28 associated with a plurality of applet processes 42. In one embodiment of the present invention, each web/emulation server 26 is operable to manage a thousand such connections.

Client thread 28 executes under web/emulator server 26 and is operable to communicate with a legacy host system across a persistent TCP/IP socket connection 30. Client thread 28 is operable to interface between TCP/IP environment 14 and public Internet/intranet environment 16. Applet process 42 executes under web browser 38 and is operable to communicate with client thread 28 across persistent TCP/IP socket connection 44. In one embodiment of the present invention, client thread 28 and applet process 42 using a web/emulator data flow. Applet process 42 is further operable to provide a terminal session to a user of the client system 36. The terminal session can comprise a 3270, 5250, NVT or VT220 type terminal session. This terminal session provided by applet process 42 and client thread 28 is supported by a persistent TCP/IP socket connection which allows real-time bidirectional communication with the legacy host system.

In one embodiment of the present invention, the applet process uses three threads to implement the terminal session. The applet process uses a READ thread, a WRITE thread and an EMULATION thread. The READ thread provides a buffer interface to persistent TCP/IP socket connection 44 and reads information from the socket. The WRITE thread provides a buffer interface to persistent TCP/IP socket connection 44 and writes to the socket. The EMULATION thread provides the user interface representing the terminal session on the legacy host system. In this embodiment, the applet process and the client thread communicate using a web/emulator data flow based upon the communication protocol that is set forth in APPENDIX A.

According to the present invention, a user of client system 36 can access data and applications on the legacy host system using web browser 38 where the access is provided through a persistent bidirectional connection to the legacy host system. Persistent TCP/IP socket connections 30 and 44 provide this persistent bidirectional connection to IBM host system 18 or UNIX host system 19 such that real-time host updates, security, encryption, help-desk support, and other real-time features are supported. One embodiment of the present invention uses SUN MICROSYSTEMS' JAVA technology and includes JAVA-capable web browsers 38 and embedded JAVA applet processes 42 to provide terminal session connectivity to client systems 36.

The present invention provides connectivity to legacy host systems such as IBM host system 18 and UNIX host system 19 through web browser 38 without the need for specialized emulation software to be manually loaded on each client system 36 and without the need for user programming. Web/emulator server 26 downloads applet code 34 to client system 36 when the uniform resource locator (URL) of the legacy host system is selected by the user. This is accomplished automatically without requiring service personnel to load software on client system 36.

The present invention also allows the expansion of access to existing data and applications on legacy host systems from existing client systems 36 using existing network capabilities. The present invention provides a network environment 10 that allows the use of a public Internet/intranet environment 16 having web browser tools, such as JAVA tools, and web-serving to incorporate Internet-type technologies, through the Internet or an intranet, with existing network architectures. Thus, an organization can implement web browser 38 based access to legacy host systems, such as IBM host systems 18 and UNIX host systems 19, without scrapping or significantly restructuring existing network resources.

FIG. 2 is a flow chart of a method for connecting a client system to a legacy host system using a web/emulator server according to the teachings of the present invention.

In step 50, a uniform resource locator (URL) associated with a legacy host system is selected from a web browser executing on a client system. The web browser can comprise a JAVA-capable NETSCAPE NAVIGATOR web browser as mentioned above. The selected uniform resource locator is received by a web/emulator server in step 52. In step 54, the web/emulator server downloads executable code for an applet process to the client system for connecting to the legacy host system. In step 56, the client system executes the applet process under the web browser. The applet process can comprise a JAVA applet for execution within a JAVA virtual machine within the NETSCAPE NAVIGATOR web browser.

In step 57, the applet process connects to a client thread executed by the web/emulator server, and the client thread connects to the legacy host system across persistent TCP/IP socket connections. In step 58, the client thread then communicates with the legacy host system across the persistent TCP/IP socket connection. This communication allows the client thread to establish and maintain a terminal connection to the legacy host system. In step 60, the client thread communicates with the applet process across a persistent TCP/IP socket connection. This communication can be accomplished using a web/emulator data flow such as that based upon the communication protocol set forth in APPENDIX A.

In step 62, the applet process provides a terminal session to a user of the client system According to the present invention, this terminal session allows real-time bidirectional communication with the legacy host system across a persistent TCP/IP socket connection to the legacy host system. This terminal session, as mentioned above, can comprise a 3270, 5250, NVT or VT220 type terminal session.

The terminal session can be terminated by the user of the client system as desired The applet process and client thread are terminated, in step 64, when the terminal session is terminated. In one embodiment, after termination, the applet process is removed from execution memory and is no longer present on the client system. In another embodiment, the executable code for the applet can be stored on a data storage device associated with the client system. In this embodiment, the web/emulation server can check the client system to determine whether new executable code for the applet needs to be downloaded based upon the version present, if any, on the data storage device of the client system.

The present invention provides an interface to legacy data flows, such as telnet (TN) data flows, across persistent TCP/IP socket connections to give users persistent bidirectional access to legacy host system data in terminal sessions, such as 3270, 5250, NVT and VT220 type terminal sessions. According to the present invention, terminal emulation is partially provided by applet executable code downloaded from the web/emulation server. The user can select the uniform resource locator (URL) of the legacy host system via a web browser package, such as NETSCAPE's NETSCAPE NAVIGATOR, and transparently receive the applet code which is executed and invokes an appropriate terminal session.

The present invention provides users of the client system access to real-time legacy host system data and applications using a web browser. The web/emulator server system converts standard legacy data flows into web/emulator data flows and vice versa permitting multi-session, multi-protocol access to legacy data and applications. The applet process converts the web/emulator data flows into a terminal session for display to the user. As mentioned above, the web browser can comprise a JAVA-capable web browser, the applet process can be a JAVA applet, and the web/emulator data flow can be based upon the protocol set forth in Appendix A. This embodiment of the present invention can blend web browsers enhanced by SUN MICROSYSTEMS' JAVA with legacy host systems having TCP/IP connectivity to allow users on any client system platform to connect to and access legacy host systems via 3270, 5250, NVT and VT220 type terminal emulation.

FIG. 3 is a block diagram of load-balancing across multiple web/emulator servers according to the teachings of the present invention. An HTTP server 70 is coupled to a client system 72. HTTP server 70 receives request information, REQUEST, from client system 72 in the form of a uniform resource locator (URL) and provides redirection information, REDIRECT, to client system 72. Client system 72 is then coupled to one of a plurality of web/emulation servers 74 according to the redirection information. In this manner HTTP server 70 can redirect access by a plurality of client systems 72 to manage the load on web/emulation servers 74 to ensure a balance across all available web/emulation servers 74.

This load-balancing can remain transparent to a user of client system 72. The user enters the uniform resource locator associated with the legacy host system. That information is transmitted to HTTP server 70 as a request HTTP server 70 interprets the request, identifies the selected legacy host system, and selects a web/emulation server 74 to manage the connection. This selection of a web/emulation server 74 can be based upon information of the current loading of each web/emulation server 74. HTTP server 70 transparently provides redirect information to client system 72 which identifies the uniform resource locator of the selected web/emulation server 74. Client system 72 then initiates the above described terminal session through the selected web/emulation server 74 and the selected web/emulation server 74 connects to the legacy host system as described above.

The present invention provides web browser connectivity with relatively low initial and recurring cost. The need for individual emulation software products based upon each particular client system is removed. This eliminates many technical support, help desk and software distribution problems, including version level control and configuration management issues. Extensive user training is no longer necessary because web browsers generally offer intuitive common user interfaces and are known by many users Implementation time is improved by taking advantage of an existing widely-installed web browser base. Specifically, the platform independence provided by the JAVA architecture allows the web browser terminal emulator of the present invention to avoid problems with operation differences between computer environments. In additions numerous users can be supported concurrently by each web/emulation server. For example, the OC://WEBCONNECT™ product from OPENCONNECT SYSTEMS can support a thousand users per instance.

The present invention provides connectivity from any client system, such as a personal computer or computer workstation, to a legacy host system, such as a mainframe or mid-range system, without costly redesign or rebuilding of legacy applications. The benefits of a distributed client/server type data exchange can be realized without requiring systems redesign. This approach means that the many advantages of Internet-type access and functionality can be blended into an organization's network architecture simply and efficiently, thus protecting existing information technology infrastructures and investments.

Direct Host/Server Interface for OS/390 Host

Referring again to FIG. 1, as explained above, the system of FIG. 1 is used within a "browser-based SNA-capable" communications network, where a server 26 downloads an applet process 42 to a client system 36 in response to a URL call from client system 36 to host system 10. Host system 10 (with or without the aid of a separate gateway) provides a SNA-type data flow. The applet process 42 generates the terminal emulation session at client system 36. Various embodiments of the system of FIG. 1 use different SNA data to provide different terminal sessions, such as 3270, 3287, 5250, NVT, or VT220 terminal sessions.

The connection between host system 18 and client system 36 is a persistent connection. Various embodiments of the invention negotiate and maintain the persistent connection using different configurations. For example, the network may or may not include a TN server (gateway 20) or a built-in TN interface at host system 18. Also, although FIG. 1 illustrates server 26 as having both web server and emulation server functions implemented on the same computer, they may be implemented on separate computers.

Regardless of the specific configuration, common characteristics of the invention are the downloading of an applet process 42 to the client system and the negotiation of a persistent connection between legacy system 18 and client system 36.

The terminal session data flow is established in accordance with a protocol associated with the applet process 42, that is, a protocol that permits applet process 42 to communicate with host system 18. This communication may be via emulation programming at server 26. In the example of this description, applet process 42 is a Java applet and the protocol is consistent with the Java language. However, the invention may be implemented with appletts in other languages, with a common characteristic being that the applet is downloaded to provide client-executable code and has an associated protocol that permits it to communicate with server 26.

Figure 4:
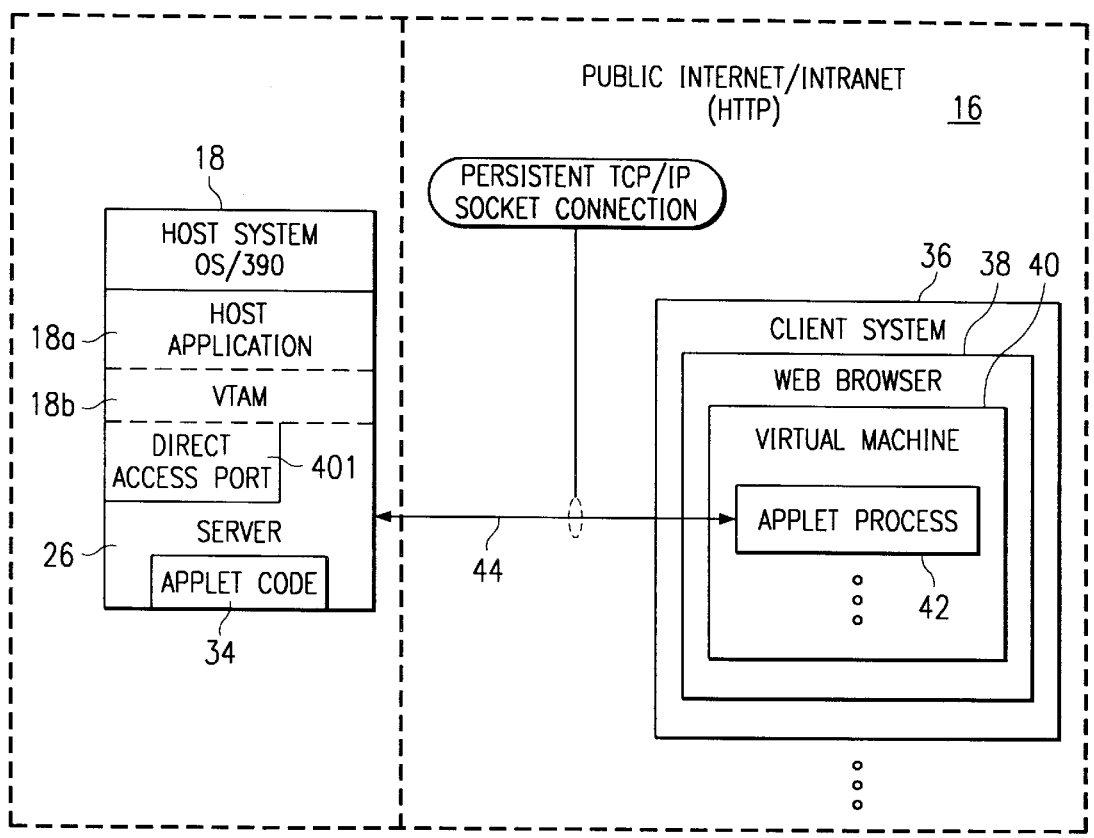
FIG. 4 illustrates an alternative to the embodiment of FIG. 1, providing a direct interface to an OS/390 host system.

FIG. 4 illustrates a "direct connect" configuration, used where host system 18 is of the type that uses an MVS operating system. For examples host system 18 might be an OS/390 IBM mainframe In the embodiment of FIG. 4, server 26 resides on host system 18, using a port of host system 18. Server 26 is used to establish the same TCP/IP persistent connection between it and client system 36 as described above, with server 26 downloading applet code 34 to be executed as an applet process 42 by client system 36.

In the embodiment of FIG. 4, the TN link is eliminated. This architecture may be referred to as a two-tiered" architecture. There is no need for a TN (telecommunications network) over the TCP/IP.

Server 26 communicates with the host application 18a directly through a VTAM (virtual telecommunications access method) interface 18b. There is no intermediate path through a TN protocol, stack at a gateway 20 or through a built-in TN gateway. Thus, there is no TCP/IP protocol between server 26 and host system 18.

VTAM interface 18b is a widely known and used communications interface of IBM OS/390 systems that provides access to application programs. An OS/390 port 401 is provided on server 26 for this purpose.

The embodiment of FIG. 4 provides both 3270 and 3287 terminal sessions. Techniques for providing 3287 sessions are described in U.S. Pat. Ser. No. 09/183,303, entitled "Server and Terminal Emulator for Persistent Connection to a Legacy Host System with Printer Emulation", incorporated by reference herein.

Other than the "backend" interface to host system 18 and the absence of a TN link, server 26 is the same as described above in connection with FIG. 1. It downloads the applet process 42 and establishes a TCP/IP persistent connection between host system 18 and client system 36, using a special protocol to communicate with the applet process 42.

Thus, in the embodiment of FIG. 4, server 26 incorporates both "emulation server" and "web server" functions. Consistent with conventional terminology, the "web server" functions include handling HTML pages and launching applet code 34, whereas the "emulation server" functions include negotiation of the persistent connection and communicating with the applet process 42 after the applet code has been downloaded. In other embodiments, the web server may be separate from the emulation server and separate from the host system 18

An advantage of the direct connection of FIG. 4 is that it permits encryption from end to end. For example, public-key encryption techniques, such as those using the RSA algorithm, can be implemented by server 26.

Other Embodiments

Although the present invention has been described in detail, it should be understood that various changes, substitutions and alterations can be made hereto without departing from the spirit and scope of the invention as defined by the appended claims.

What is claimed is:

1. A computer-implemented terminal session emulator for providing browser-based access to OS/390 legacy host applications, comprising:

an emulation server operable to negotiate a persistent connection between a legacy host system and a client system, said emulation server further in communication with a web server; and applet code operable to create an applet process executing under a web browser on a client system, said applet code being downloadable from the web server to the client system in response to receiving a uniform resource locator associated with the legacy host system, and, when executed by the client system, the applet process operable to communicate with said emulation server to provide a terminal session to a user of the client system via said persistent connection;

wherein said emulation server is located at said host system and has a port for communicating directly with said host system.

2. The emulator of claim 1, wherein the persistent connection is established by means of a protocol that handles communications between said applet process and said emulation server.

3. The emulator of claim 1, wherein said emulation server is further operable to perform bi-directional protocol conversions between the legacy host data stream and a web browser data stream.

4. The emulator of claim 1, further comprising said web server, such that said emulation server and said web server functions are integrated and are both at the host.

5. The emulator of claim 1, wherein said port communicates with said host via a VTAM interface.

6. The emulator of claim 1, wherein the applet code comprises executable code for a JAVA applet to be executed under a JAVA-capable web browser.

7. The emulator of claim 1, wherein the persistent connection is a persistent TCP/IP connection.

8. The emulator of claim 1, further comprising a client thread at said emulation server operable to provide both upstream and downstream communications.

9. The emulator of claim 1, wherein the emulation server is operable to communicate using a 3270 data flow and the applet process is operable to provide a 3270 type terminal session.

10. The emulator of claim 1, wherein the emulation server is operable to communicate using a 3287 data flow and the applet process is operable to provide a 3287 type terminal session.

11. The emulator of claim 1, wherein said web server receives a web browser data stream in accordance with a HTTP protocol.

12. A computer-readable medium whose contents are an emulation server process that causes a client system to provide a terminal emulation session in direct connection to an OS/390 legacy host system, the client computer system having a web browser program, by performing the steps of:

establishing a persistent connection to said client system, using a communications protocol associated with an applet process executing on said client system and compatible with said web browser; and communicating with said applet process to provide said terminal emulation session;

wherein said establishing and communicating steps are performed at the host; and wherein said communicating step is performed by means of a port in direct communication with a communications interface of said legacy host system.

13. The medium of claim 12, wherein the computer-readable medium is further operable to download said applet code.

14. The medium of claim 12, wherein the applet process comprises a JAVA applet executing under a JAVA-capable web browser.

15. The medium of claim 12 wherein the persistent connection is a persistent TCP/IP connection.

16. The medium of claim 12, wherein the applet process is operable to provide a 3270 type terminal session.

17. The medium of claim 12, wherein the applet process is operable to provide a 3287 type terminal session.

18. The medium of claim 12, wherein said communications interface is a VTAM interface.

19. The medium of claim 12, wherein said medium is further operable to encrypt the data stream received into said port before said data stream is communicated to said client system.

20. A method for connecting a client system to an OS/390 legacy host system for terminal emulation, comprising:

executing an applet process under a web browser on the client system in response to selection of a uniform resource locator associated with a legacy host system;

connecting the applet process to the legacy host system across a persistent connection;

communicating between the applet process and the legacy host system across the persistent connection; and providing a terminal session to a user of the client system by the applet process, such that the terminal session is supported by the persistent connection allowing communication with the legacy host system directly to a communications interface of said legacy host system.

21. The method of claim 20, further comprising downloading executable code for the applet process to the client system in response to the selection of a uniform resource locator associated with the legacy host system.

22. The method of claim 20, wherein connecting the applet process to the legacy host system is accomplished using a client thread executing under a server.

23. The method of claim 20, wherein communicating between the applet process and the legacy host is accomplished using a data flow based upon a specified communication protocol.

24. The method of claim 20, wherein executing the applet process comprises executing a JAVA applet under a JAVA-capable web browser.

25. The method of claim 20, wherein providing a terminal session comprises providing a 3270 type terminal session.

26. The method of claim 20, wherein providing a terminal session comprises providing a 3287 type terminal session.

27. The method of claim 20, wherein said communications interface is a VTAM interface.

28. The method of claim 20, further comprising the step of encrypting the data stream received from to said host interface before transmission to said client system.

* * * * *